United States Patent [19]
Fleming

[11] 3,874,605
[45] Apr. 1, 1975

[54] CHOPPING CYLINDER FOR FORAGE HARVESTERS OR THE LIKE

[75] Inventor: Philip F. Fleming, West Bend, Wis.

[73] Assignee: Gehl Company, West Bend, Wis.

[22] Filed: Apr. 3, 1974

[21] Appl. No.: 457,588

[52] U.S. Cl.................... 241/292, 83/674, 241/222
[51] Int. Cl. ...................... B02c 23/00, B02c 18/06
[58] Field of Search ........................... 241/222–225, 241/292, 292.1, 294; 83/674

[56] References Cited
UNITED STATES PATENTS

| | | | |
|---|---|---|---|
| 1,314,575 | 9/1919 | Davidson | 241/292 X |
| 3,135,307 | 6/1964 | Blanshine | 241/222 UX |
| 3,141,485 | 7/1964 | Bonner et al. | 241/292 X |
| 3,217,765 | 11/1965 | Anderson | 241/225 X |
| 3,729,143 | 4/1973 | Wagstaff | 241/292.1 UX |
| 3,805,660 | 4/1974 | Burrough | 241/222 UX |
| 3,817,305 | 6/1974 | Gibbs | 241/292 X |

Primary Examiner—Granville Y. Custer, Jr.
Assistant Examiner—Howard N. Goldberg
Attorney, Agent, or Firm—James E. Nilles

[57] ABSTRACT

A chopping cylinder for a forage harvester or the like and which has a plurality of knife supporting heads on which are mounted a plurality of generally longitudinally disposed, spiral knives. The cylinder can be used with all of the knives in a conventional manner or alternatively can be used with only one knife and counter-balance means for the said one knife whereby the material is cut into longer lengths.

2 Claims, 6 Drawing Figures

CHOPPING CYLINDER FOR FORAGE HARVESTERS OR THE LIKE

BACKGROUND OF THE INVENTION

The invention relates to forage choppers or the like of the rotary cylinder type having a plurality of generally spiral blades mounted on a series of heads that are in turn secured to a central shaft.

Various prior art attempts have been made to vary the length of cut of the knives without changing the speed of either the cylinder or the mechanism for feeding the material into the cylinder. These prior art attempts have included making the knives of less than full width and then staggering the shortened knives around the periphery of the cylinder. It has furthermore been proposed to counter balance the cylinder to compensate for knives which may have been removed, but these prior devices have had several shortcomings, one of which is the fact that the material being fed into the cylinder becomes entangled with that portion of the cylinder from which the knives have been removed. Furthermore, as the knives wear, they consequently become of less weight and the counter-balance means no longer adequately serves its function of counter-balancing the knife.

SUMMARY OF THE INVENTION

The present invention provides a multi-knife cylinder of the type having a plurality of heads, for example two or three heads, each head of which is fabricated from a pair of parallel plates. The counter-balance means provided by the present invention are removably located between the pairs of plates of the heads and in out-of-the-way and unobstructive to the material being fed to the cylinder. The invention also contemplates the use of removable shims which can be removed as necessary so as to compensate for the wear of the blades and thus maintain proper balance of the cylinder. The invention also contemplates the use of filler pieces which act to fill slots on the plates which are alternatively used for receiving the nut means that hold the knife when such a knife is to be used.

These and other objects and advantages of the present invention will appear hereinafter as this disclosure progresses, reference being had to the accompanying drawings.

THE DRAWINGS

DESCRIPTION OF A PREFERRED EMBODIMENT

Figure 1:
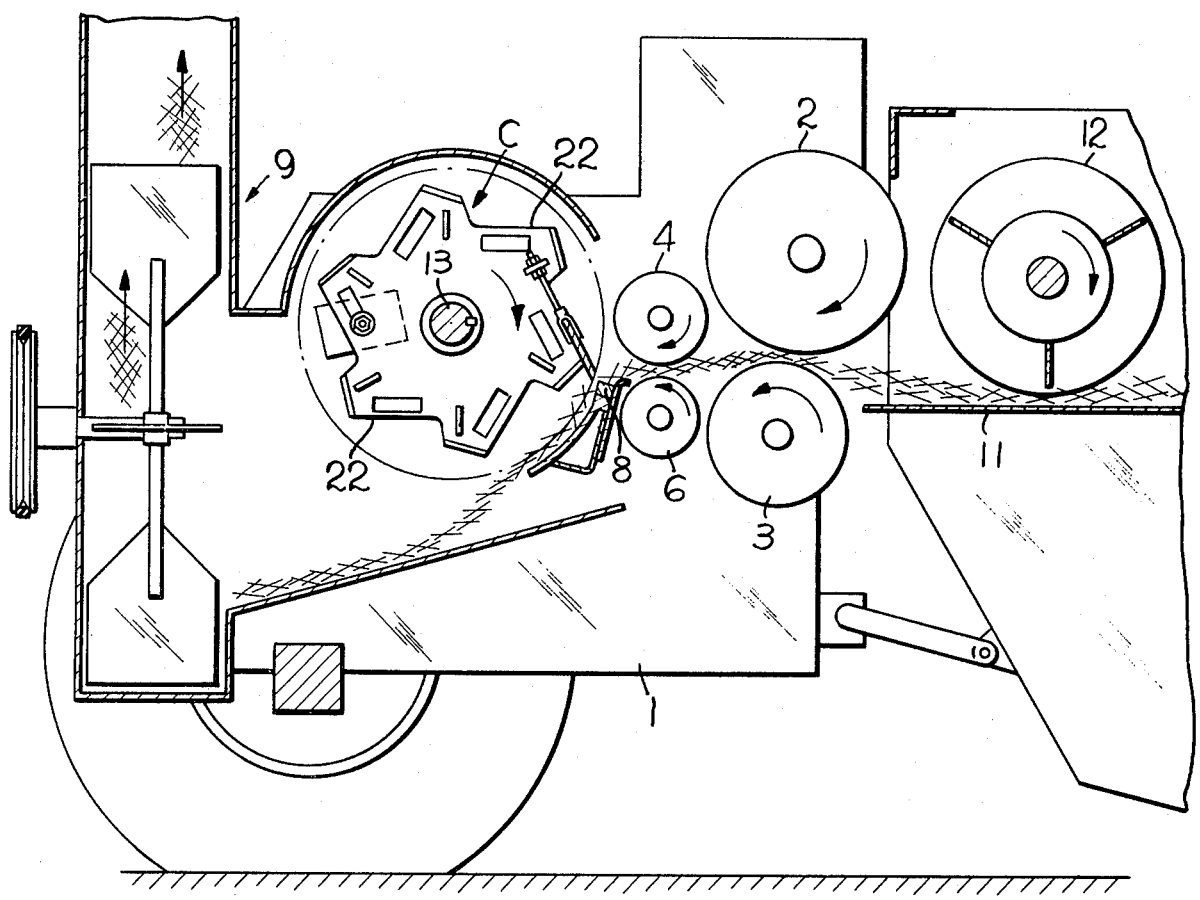
FIG. 1 is a longitudinal, vertical, cross sectional view of a forage chopper embodying the present invention, some of the conventional components being shown schematically for clarity.

The apparatus shown in FIG. 1 is of the forage harvester type and comprises a conventional wheel supported housing 1; a conventional assembly of upper and lower feed rollers 2 and 3 and an associated variable speed drive mechanism (not shown) of conventional construction; a pair of conventional crop compacting rollers 4 and 6; a rotary cylinder C; a stationary shear bar 8; and a conventional blower assembly 9 for discharging chopped crop material from the housing 1. A conventional feed table attachment 11 is also provided for the chopper housing 1 and has a crop hold-down roller 12.

The knife supporting cylinder C comprises a rotary shaft 13, on which are mounted three knife supporting heads. The heads 14, 15 and 16 each comprise a pair of parallel plates 18 and 19 which are non-rotatably secured at their centers to the shaft 13, and which are connected together at their peripheries by a circumferential series of saddle brackets 21. The plates 18 and 19 are conventionally contoured to provide six circumferentially spaced knife seats 22 (FIG. 2).

Figure 2:
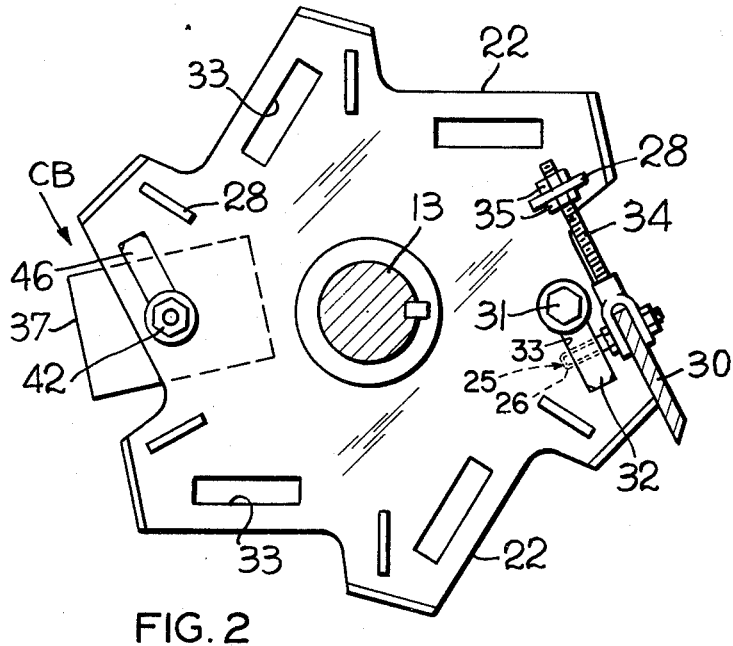
FIG. 2 is an enlarged view of the cylinder shown in FIG. 1, certain parts also being shown in section or removed for the sake of clarity.
Figure 3:
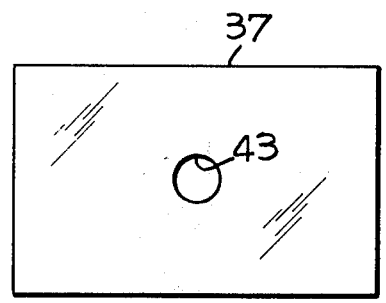
FIG. 3 is a side elevational view of one of the counter-balance weights shown in FIG. 2, but on an enlarged scale.
Figure 4:
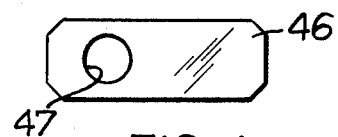
FIG. 4 is a side elevational view of a filler piece as shown in FIG. 2, but on an enlarged scale.
Figure 5:
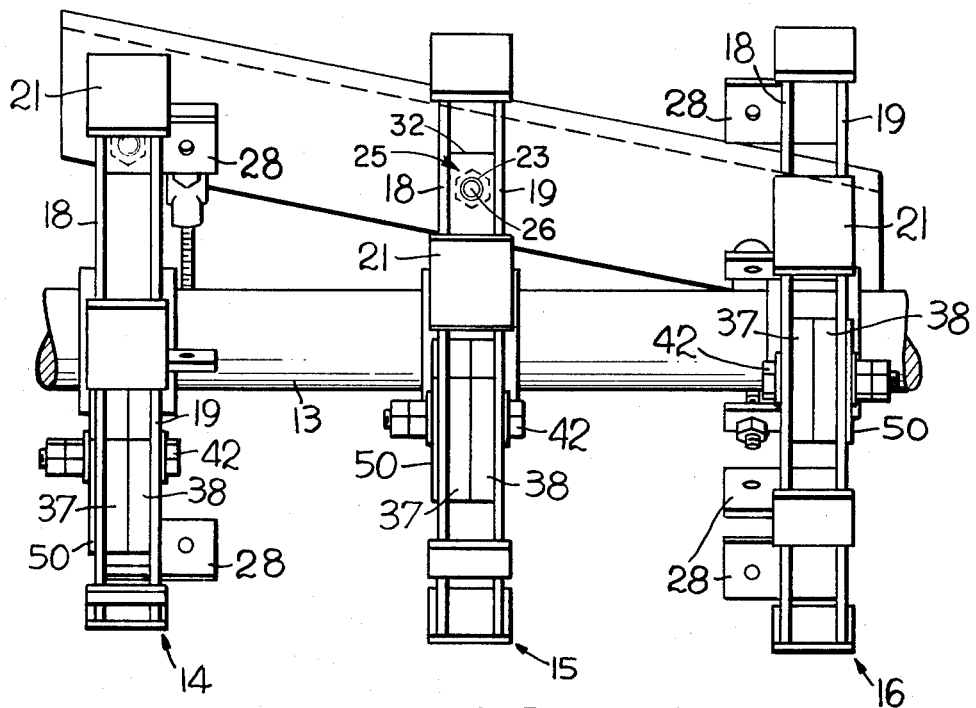
FIG. 5 is a transverse, elevational view of the cylinder shown in FIG. 2.

The knife supporting cylinder comprising the shaft 13 and heads 14, 15 and 16 may be equipped in conventional manner with identical full length chopping knives 30, only one of which is shown in FIGS. 1, 2 and 5. Such full length knives are conventionally shaped to present a spiral cutting edge, and the knife seats 22 on the heads 14, 15 and 16 are so arranged that the opposite ends of a full length knife may bear upon knife seats 22 of the end head and so that a mid-portion of the full length knife may bear upon a knife seat 22 of the intermediate head 15. Bolt means 25 are provided to hold the full length knives in place, the bolt means 25 comprising bolts 26 which may be inserted through mounting holes 23 of the full length knives, and threaded nut inserts 32 which extend across the plates 18 and 19 and are located in slots 33 in the plates 18 and 19 of the heads.

Also part of the knife supporting cylinder C are lugs 28 and the saddle brackets 21 of the end heads 14 and 16. These lugs receive adjustable screws for radially adjusting the full length knives in conventional manner, as follows.

A conventional full length knife 30 is secured across the aforementioned seats of the three heads and held in place by the bolt means 31 and nut inserts 32. It will be noted that insert 32 is located in the slots 33 that are formed in the heads. The blade is adjustable by the threaded yoke 34 and is held in place by the nuts 35 which abut against the lugs 28. If desired, six of such knives may be mounted around the periphery of the heads to provide a cylinder of conventional construction.

When it is desired to use only one such knife for the purpose of providing a longer length of cut to the material, only one such knife would be used as shown in FIG. 2 and counter balancing means CB are provided at the diametrically opposite side of the cylinder so as to precisely counter-balance the single knife 30 and its attaching means.

More specifically, the counter-balance means comprises a pair of counter-balance weights 37 and 38 which are preferably located between each of the pairs of plates 18 and 19 and are furthermore located radially inwardly between the plates a sufficient distance so that they do not interfer with the material being fed into the cylinder as shown in FIG. 1. The counter-balance weights 37 and 38 are rigidly held in position between the head plates 18 and 19 by the bolt means 42 which extend through apertures 43 in the counter-balance weights. For the purpose of accurately and rigidly holding the bolts 42 in the head plates, a filler piece 46 having an aperture 47 is snugly received in slots 33 of the head plates. Filler pieces 48 thus serve to accurately locate the bolt means 42 in the head plates 18 and 19 and consequently act to rigidly secure the counter-balance plates within the head plates 18 and 19.

Figure 6:
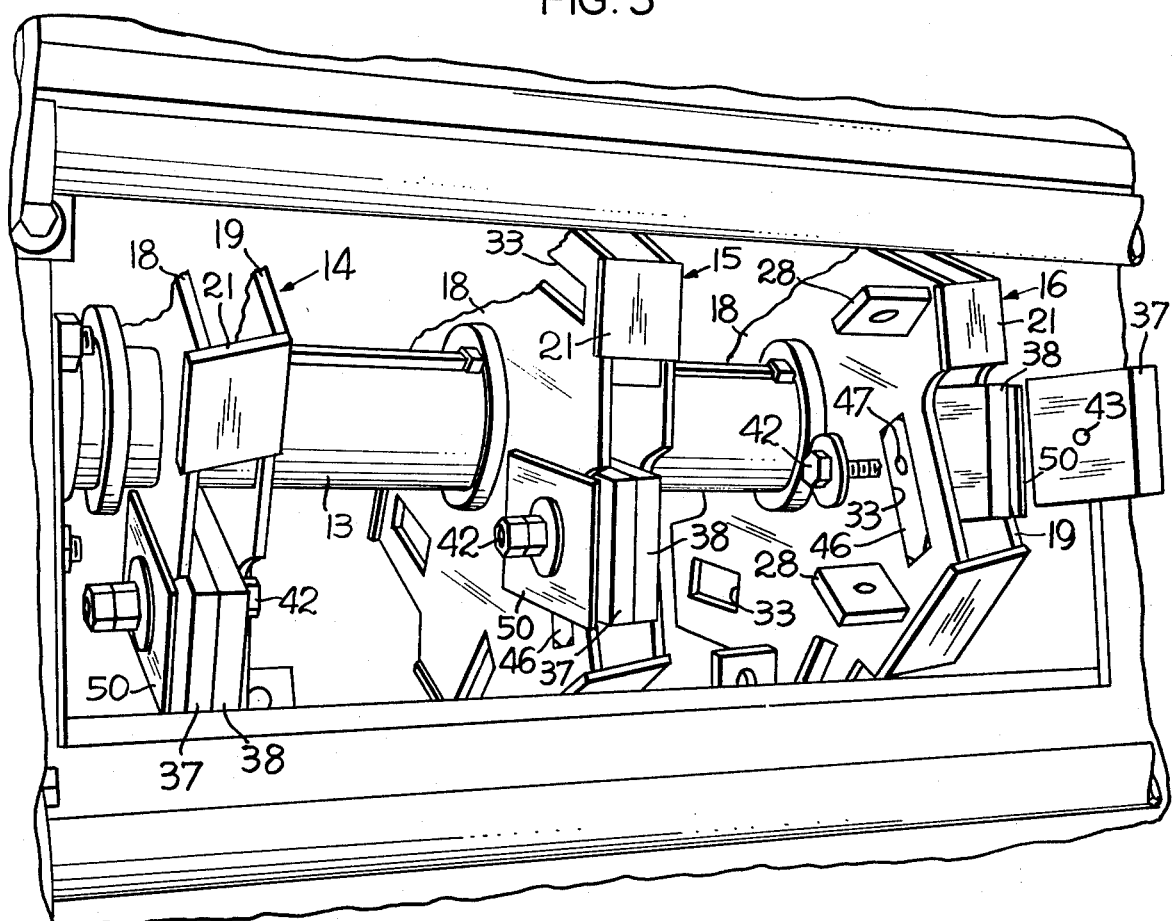
FIG. 6 is an enlarged, fragmentary, perspective view of the rotary chopping cylinder shown in FIGS. 1 and 2, certain parts being shown as broken away or removed for the sake of clarity, and one of the counter-balance weights and its bolt means being shown in an exploded fashion.

As the knife is used it may wear considerably and thus lose weight to an appreciable degree. This causes imbalance of the cylinder and rather than replace the blade with a new one, relatively thin shims 50 have been provided and which may be removed as the need arises to compensate for the loss of weight of the knives. These shims 50 as shown in FIG. 6 are mounted on the outside of the head and are held in place on the bolt means 42 and can thus be easily removed therefrom.

By means of the filler pieces 46, the counter-balance weights 37 and the shims 50, a convenient and easily installed or removed counter-balance means has been provided for converting a conventional multiblade chopping cylinder to an accurately balanced, single blade chopping cylinder. The counter-balance means provided by the present invention are located rigidly in the head plates and in such a position that they do not form an obstruction to or balling up of the incoming crop material.

I claim:

1. A chopping cylinder for a forage harvester or the like comprising a central shaft, a pair of heads mounted transversely at spaced locations on said shaft, said heads each including a pair of spaced apart parallel plates having aligned peripheral seating surfaces, a single knife only detachably secured on said seating surfaces and in a generally longitudinally arranged position, means for detachably securing said knife to said heads and including a bolt and nut insert, slots in said head plates for the reception of said nut inserts, and counter-balance weights removably mounted between the said pairs of plates of said heads and radially within the periphery of said heads so as to form no obstruction to material being chopped, said counter-balance weights being located diametrically opposite to said knife mounted on said heads, and filler pieces insertable in those slots which are located at a diametrically opposite location from said knife, and removable bolt means extending through said plates, said counter-balance weights, and said filler pieces, whereby said counter-balance weights are rigidly and accurately located within the plates of said heads.

2. The cylinder set forth in claim 1 including shim means removably mounted on said removable bolt means.

* * * * *